United States Patent [19]

Brown et al.

[11] 3,886,525

[45] May 27, 1975

[54] SHARED DATA CONTROLLED BY A PLURALITY OF USERS

[75] Inventors: Paul J. Brown, Poughkeepsie; Ronald M. Smith, Wappingers Falls, both of N.Y.

[73] Assignee: International Business Machines Corporation, Armonk, N.Y.

[22] Filed: June 29, 1973

[21] Appl. No.: 375,224

[52] U.S. Cl. .............................................. 340/172.5
[51] Int. Cl. ............................ G06f 9/12; G06f 9/18
[58] Field of Search .................................. 340/172.5

[56] References Cited

UNITED STATES PATENTS

| | | | |
|---|---|---|---|
| 3,566,357 | 2/1971 | Ling | 340/172.5 |
| 3,579,199 | 5/1971 | Anderson et al. | 340/172.5 |
| 3,585,599 | 6/1971 | Hitt | 340/172.5 |
| 3,671,940 | 6/1972 | Kronies et al. | 340/172.5 |
| 3,736,566 | 5/1973 | Anderson et al. | 340/172.5 |
| 3,781,810 | 12/1973 | Downing | 340/172.5 |
| R27,485 | 9/1972 | McGilvray et al. | 340/172.5 |

*Primary Examiner*—Gareth D. Shaw
*Assistant Examiner*—Michael C. Sachs
*Attorney, Agent, or Firm*—R. W. Berray

[57] ABSTRACT

A data processing technique is disclosed which permits a plurality of users of a data processing system to share data in a data store, providing independent and asynchronous access to the data for subsequent processing by either user. The sharing of small data items is accomplished without requiring the use of interlocks to prevent one user from obtaining access to the shared data item while the other is processing the data for subsequent replacement in the shared data store. In addition, sharing of data items of sufficient size permit the user to build up controls for safe and efficient sharing of data items of any size.

2 Claims, 4 Drawing Figures

SHARED DATA CONTROLLED BY A PLURALITY OF USERS

BACKGROUND OF THE INVENTION

1. Field of The Invention

This invention relates to multiprocessor or multiprogrammed computing systems and more particularly to a technique for permitting shared use of data in a data store.

2. Description Of The Prior Art

The need for safe and efficient means of resolving contention by a number of users for access to data being shared by all of the users in a data store is well discussed in a number of prior art references. This prior art is represented by a number of patents, assigned to the assignee of this invention, and include U.S. Pat. No. 3,405,394 — issued Oct. 1968, U.S. Pat. No. 3,528,062 - issued Sept. 1970, and U.S. Pat. No. 3,676,860 - issued July 1972.

In all of the above cited patents, the plurality of users, whether it be a plurality of programs in a single processor or a data processing system which includes a plurality of processors, requires the use of special instructions which must be executed prior to obtaining access to the shared data. These special instructions are required to examine a particular addressed location in the shared storage to determine whether or not a previous user has established an indication that the shared data is presently being accessed and processed. The access to the shared data must invariably be preceded by access to the associated interlock information, lockword, or gate word, as this information is variously designated.

If a user desires access to shared data, and subsequently finds that the associated interlock prevents access to the shared data, various alternatives are available to control the user to permit subsequent re-examination of the interlock before permitting the user to obtain access to the shared data. These techniques are wasteful of computer facilites and require a number of programming techniques which, under certain conditions, can create error situations where shared data becomes locked and subsequently is unable to be unlocked for further use. Also, computing time is wasted in examining the interlock information to determine if a conflict exists, when many times no conflict is in fact present, such that if the user were able to immediately access the data, perform the processing required, and then determine whether or not there was a conflict, efficiency would be enhanced.

BRIEF DESCRIPTION OF THE INVENTION

It is an object of this invention to permit shared use of data in a data processing system by a plurality of users.

It is another object of this invention to provide shared use of small data items in a data processing system by a plurality of users which eliminates the need for examining a separately accessed interlock prior to access to the associated shared data.

It is also an object of this invention to provide shared access to small data items in a data processing system by a plurality of users where each user may have simultaneous access to the data item for processing by a program of instructions, wherein the existence of a conflict in the use is deferred until a user attempts to replace the accessed shared data item with a modified form of the data after processing.

It is also an object of this invention to provide the shared access to data items of sufficient size that they may contain enough control information to be used by the program for the self contained building up of controls for the sharing of large data items.

The above objects are achieved in a data processing system which incorporates a new program instruction. Each user of shared data is permitted to access the shared data at its addressable location in the shared data store for further processing by the sequence of program instructions. After processing, the processed data is to be returned to the addressed location of the shared data. Prior to returning the processed data to the addressed location in the shared data store, the new instruction is accessed in the sequence of instructions. The new instruction, called "Compare and Swap," accesses the addressed location in the data store to obtain the data therefrom. The data content of the addressed location accessed by the instruction is compared with the data accessed from the addressed location prior to the processing. As a result of this compare, it can be determined that during the period of processing on the shared data, another user has or has not also accessed the shared data for processing, and returned a different value of the shared data back to the addressed storage location. If, in response to the new instruction, it is determined that the value of the addressed location has been modified by another user, the modified value is retained by the user and the processing is reinitiated on the modified value. If the value of the data in the addressed location accessed by the new instruction is still identical to the value of the data accessed by the user prior to processing, it can be determined that no other user has accessed the shared data and modified it. Therefore, the processed data will be transferred to the addressed location, and further processing permitted.

The instruction Compare and Swap is provided in a form which updates an entire double word in storage, and as such may be used directly to update shared data areas up to a double word in length. In addition, the double word provides sufficient information space to contain two complete storage addresses, or one storage address and a 40-bit uniqueness value. This provides the program with sufficient function to safely program the control of larger shared storage areas while maintaining the possibility of an endless loop at a much lower level than in prior art techniques. This is accomplished as follows:

1. Unconditional swapping of a single address is sufficient to program a first-in, first-out single-user-at-a-time sequencing mechanism.
2. Conditional swapping of a single address is sufficient to program a last-in, first-out single-user-at-a-time sequencing mechanism.
3. Conditional swapping of an address and 40-bit uniqueness value is sufficient to program the acquisition and return of a free storage block which may be used for event control blocks, program save areas for task switching, and work areas to accomplish the task switching.

INCORPORATED REFERENCES

The new instruction Compare and Swap, the implementation of access to data, and comparing of data can be implemented on many types of data processing systems. Representative systems which include a data store, arithmetic and logic unit, microprogram control section, and suitable data paths for incorporating the operation of the preferred embodiment of this invention are represented by:

1. U.S. Pat. No. 3,400,371 — Issued: September 1968, entitled "Data Processing System" by G. M. Amdahl et al and assigned to the assignee of this invention.
2. U.S. Pat. No. 3,585,599 - Issued: June 1971, entitled "Universal System Service Adapter" by D.C. Hitt et al and assigned to the assignee of this invention.

Reference 1 provides a detailed description of the method of controlling a central processing unit in response to program instructions by utilizing a read only control store containing microprograms for executing program instructions. Reference 2 describes all of the major portions of a data processing system including an arithmetic and logic unit, control unit, general purpose registers addressable by program instructions, and a data store.

DETAILED DESCRIPTION OF INVENTION

Figure 1:
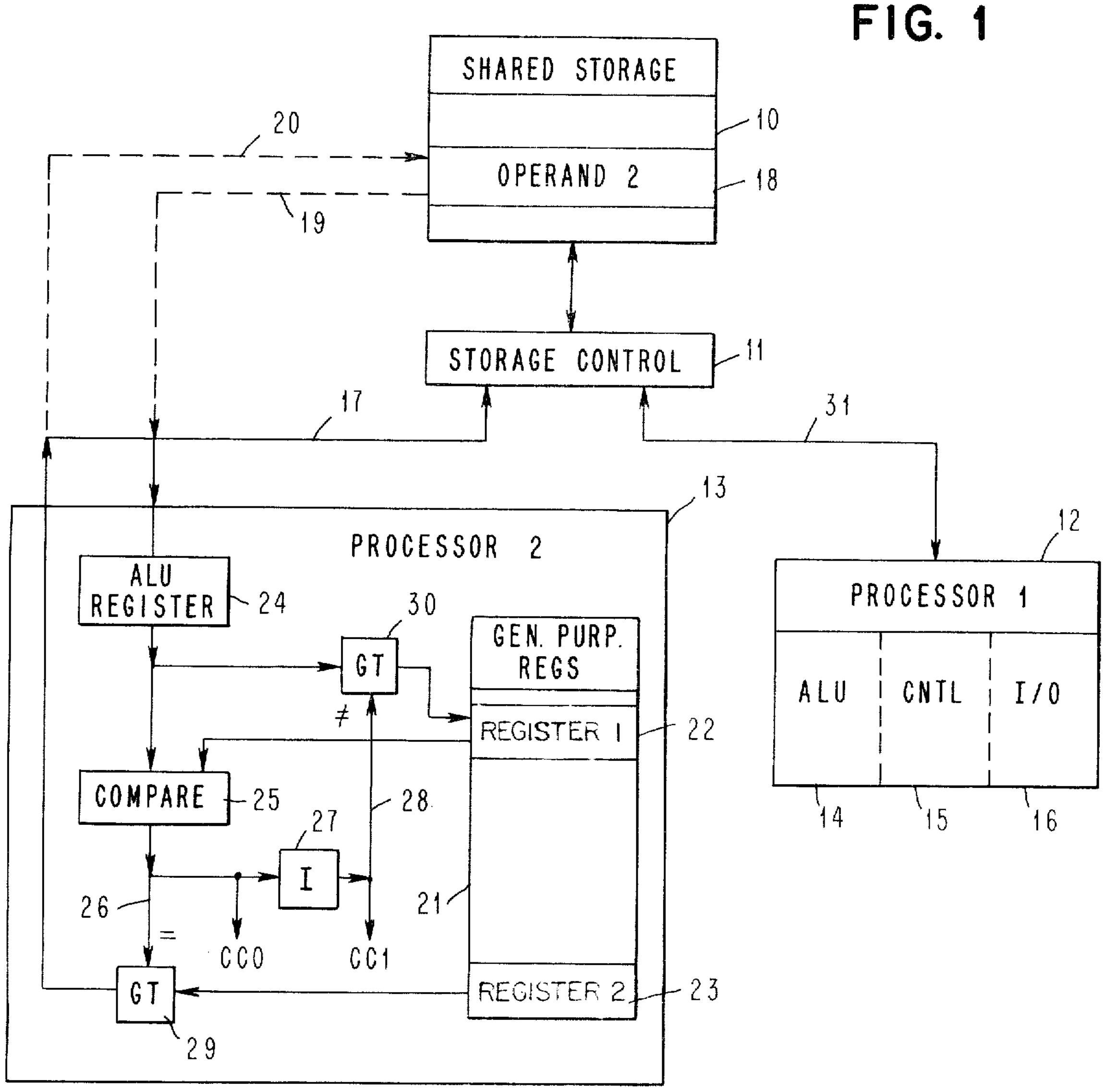
FIG. 1 is a block diagram of a multiprocessor data processing system including a logic diagram of an implementation of the preferred embodiment of this invention.

In the present invention, the term "user" broadly refers to the fact that more than one sequence of a program of instructions in a data processing system may require access to data which is in an addressable data store shared by the programs. When considered in connection with a data processing system which has a single central processing unit, the system may be capable of multiprogramming. That is, several independent sequences of program instructions may be sharing utilization of the central processing unit in accordance with independent program instruction sequences. However, in a multiprogramming system, interrupt situations may cause programs having a higher priority to interrupt programs of lower priority. If each of these programs, or users, has access to shared data in the data store, one program may have accessed the data for processing by a further sequence of program instructions but would have been interrupted by a higher priority program before the program sequence completes. That is, the shared data in the addressable location of the data store is to be replaced with processed data, but this does not occur prior to the time the program is interrupted. The interrupting, or higher priority program, may also access the shared data in the data store for processing by a further sequence of program instructions, complete the processing, and return the modified value of the shared data to the addressed location of the shared data. When the interrupted, or lower priority program, returns to complete the processing of the data in accordance with its sequence of program instructions, the results of the processing will be erroneous in view of the fact that the higher priority program has modified the shared data. When utilizing prior art techniques, the first program gaining access to the shared data would have established an interlock associated with the shared data which would have been examined by the higher priority program and found to have been previously accessed and therefore in use. Therefore, the higher priority program would have been prevented from utilizing the shared data.

In a data processing system which includes two or more central processing units, each utilizing the shared storage during execution of independent program instruction sequences, the same difficulty arises in the use of shared data when the central processing units attempt access to shared data for further processing and replacement of the shared data. In these situations, interlocks are normally required by prior art techniques to prevent one of the central processing units from gaining access to the shared data.

In prior art techniques, when the second user attempts to access the shared storage, the conflict could only be resolved either by hanging up the processing unit until the first user completed use of the shared area, or by causing the processing unit to switch to another user. However, causing the processor to switch to another user normally involves the updating of several queues and flags in the control program. In fact, the attempt to resolve a conflict over a shared data area by switching the processor in a multiprocessing system to a new user has the potential of causing several conflicts between processors over shared control areas in the control program. Unless the processor provides an instruction of sufficient power to update the flag, or Header, and any associated queues, the control program is forced to revert to hanging up the processing unit until the shared control area is free.

In the present invention, the term "Data" is utilized in the general sense. Data may be a numeric value which is to be accessed from an addressed location of shared storage and manipulated or processed to provide a new value to be reinserted in the addressed location. Further, the data in the addressed location of the data storage may take the form of a number of individual fields, each of which provides some significant information to the data processing system. Such data may include a number of fields making up a "Header" associated with the programmed control of a larger Serial Reusable Resource (SRR). An SRR may be another program of instructions, table or field of data, or some other hardware portion of a data processing system, all of which may be shared by a number of users. The data content of the Header is the common starting point for determining the states of the SRR, either free or in use, and also is used for queuing requests when contentions occur. That is, a user must first access the Header associated with the SRR to determine if the SRR is in use, how many users have already requested access to the SRR, and note the user's desire to use the SRR. Therefore, depending on the information content of the Header, the user may be granted immediate access to the SRR and therefore must modify the Header to reflect its use. The user may find, by examining the Header, that other users already have access to the SRR and therefore the user desiring the access must modify the Header to reflect the fact that it desires the use, and must modify various count values and address pointers to permit queuing of further requests for the SRR. The examination and processing of the information in the Header requires a number of program instruction sequences before the user returns the header to its addressed location.

In the present invention, the term "Register" is meant to imply any data area which is local to the user, as contrasted to the shared data area which is global, that is shared by many users. Register can imply temporary working registers or addressable general purpose registers in a central processing unit, or particular addressable locations in a data store.

In accordance with the present invention, users are permitted access to shared data or Headers for the purpose of further processing. The need for preventing access to the addressed location when another user is processing the data is eliminated by the present invention.

FIG. 1 is a block diagram of a data processing system incorporating the concepts of multiprocessor configurations. That is, an addressable shared storage 10 is accessible through a storage control 11 to a processor 12, identified as Processor 1, or a processor 13 identified as Processor 2. The shared storage 10, storage control 11, and processor 12 or 13 are configured, essentially, in accordance with the above identified Reference 2 which is a description of the major components of an IBM System/370 Model 155. The IBM System/370 family of computers have a number of architectural hardware requirements and instruction formats. When understanding the present invention, only one of the instruction formats will be discussed, and its execution explained utilizing the architecturally defined instruction-addressable general purpose registers, of which there are a total of 16.

Major sections of a central processing unit as shown in processor 12 include an arithmetic and logic unit (ALU) 14, a control section (CNTL) 15, and an I/O Channel section 16. Discussion of the various portions shown in FIG. 1, by the above mentioned Reference 2, include FIGS. 5A – 5C for the ALU 14, FIG. 4 for the control 15, and FIGS. 6A – 6E for the storage control 11.

Before discussing the logic and operation of the preferred embodiment of the present invention, specific reference will be made to logic shown in Reference 2. These include the 16 general purpose registers included in the CPU LS 106 of FIG. 5A, and the parallel adder 100 of FIG. 5B utilized to effect a compare operation. Decoding of the new instruction Compare and Swap, to be discussed subsequently, will take place in the instruction registers 108A – C of FIG. 5C. The decoding of instructions is utilized to initiate a sequence of microprogram instructions from the read only storage control section shown in FIG. 4 of reference 2.

In connection with central processing unit 13 of FIG. 1 in those parts of the unit shown, the logical functioning of the ALU 14 and control section 15 of processor 12 is depicted. The data path between processor 13 and shared storage 10 normally includes a bus 17 which would include the data and address information utilized by the storage control 11 to provide access to data at an addressed location such as that shown at 18 in the shared storage 10. The contents of the addressed location 18 may be any data as previously defined. Dotted lines 19 and 20 depict the logical path of various items of data between the processor 13 and the addressed location 18. The sixteen instruction-addressable general purpose registers are shown at 21.

To describe the functioning of the operation of the new instruction Compare and Swap, it will be assumed that a previous instruction of a program sequence would have accessed addressable location 18 and transferred the data to a particular one of the general purpose registers, i.e., 22. Subsequent to placing the data from addressed location 18 in general purpose register 22, further program instruction sequencing will take place within the ALU and the result placed in another particular one of the general purpose registers identified as location 23. Therefore, subsequent to the access of the addressed location 18, the contents of addressed location 18 will be in general purpose register 22, but the results of the program of instructions which operated on the data will have placed some modified value of the data in general purpose register 23.

Figure 2:
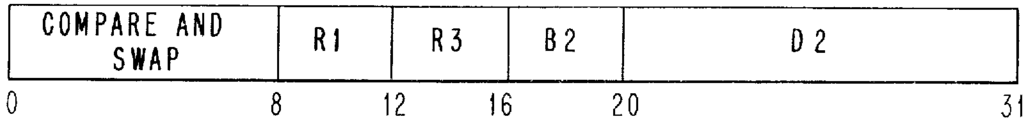
FIG. 2 shows the instruction format for the new instruction Compare and Swap.

Subsequent to the placement of the processed data in general purpose register 23, the program instruction sequence will issue the instruction Compare and Swap, the subject of the present invention. The addressable data specified by the Compare and Swap instruction is depicted in FIG. 2. In the instruction format shown in FIG. 2, the operation code in binary bits 0–7 will be decoded to signify the Compare and Swap instruction. Three different operands are identified by address information in the remaining portions of the instruction. The four binary bits 8–11, designated R1, identify the general purpose register 22 containing operand 1. The binary bits 12–15, designated R3, identify the general purpose register 23 containing the processed data, or operand 3. Binary bits 16–19, labeled B2, identify a general purpose register which contains base address information to which the remaining binary bits 20–31 of the instruction, labeled D2, are added to identify the addressed location 18 in shared storage 10.

In response to decoding the instruction shown in FIG. 2, operand 2 will be accessed from addressed location 18 and transferred, logically, on line 19 to an ALU register 24. Operand 2 will then be logically compared with operand 1 in a compare circuit 25. The compare circuit 25 may be the parallel adder 100 of the above cited reference 2 which will effect a subtraction of operand 1 from operand 2 to detect an all O's condition at the output of the adder. The compare 25 could also be a separate set of Exclusive OR circuits. The results of the compare operation at 25 will produce, alternatively, a signal on line 26 indicating equality of operand 1 with operand 2 or, through an inverter 27, inequality of operand 2 and operand 1 as indicated on a line 28.

The signal indicating equality on line 26 enables a gate 29 and the signal indicating inequality on line 28 enables a gate 30. If operand 1 is found to be equal to operand 2, gate 29 will be enabled to transfer operand 3 from general purpose register location 23 to the addressed location 18, logically, on line 20. Alternatively, an indication of inequality of line 28 will enable gate 30 to cause operand 2 contained in ALU register 24 to be stored in general purpose register 22, replacing the operand 1 data.

Further in response to the equality signal on line 26, the IBM system/370 condition code will be set to zero (CC0). Alternatively, an indication of inequality of operand 2 with operand 1 will set the condition code to 1 (CC1). The setting of the condition code to zero will signify that operand 3 has replaced operand 2 and that further processing can occur.

It is a major function of the present invention to utilize the Compare and Swap instruction, after processsing of the addressed shared data has taken place, to determine whether or not a conflict in the use of the addressed location in the data store has occurred. Therefore, a program instruction subsequent to the Compare and Swap instruction is utilized to determine whether or not the sequence of program instructions can continue with further processing, when it has been determined that no other user has modified the data in the shared address location; or whether or not the user which executed the Compare and Swap instruction must now reinitiate or reexecute the sequence of program instructions on the new value of the data at the addressed location, now contained in the general purpose register 22. A System/370 instruction, Branch on Condition Code, is utilized to sample the condition code previously set. This determines whether or not further processing can take place, or whether the user must branch back to the sequence of program instructions subsequent to the accessing of the shared data in the addressed location 18 of the data store 10. The use of Branch or Condition Codes is described in the above cited reference 1 at column 43, and a method of microprogramming such an execution is shown in connection with FIG. *5agl.*

The previous recitation of the use of the program instruction Compare and Swap is applicable to a data processing system in which there is a single central processing unit which is shared by a number of interruptable user programs. That is, one user program may have accessed the shared data in address location 18, commenced program sequencing to modify that data and then been interrupted by a higher priority program. The intermediate results of the interrupted program will be saved. When the higher priority program has completed, the lower priority program resumed, and intermediate results returned, the Compare and Swap instruction, inserted in the instruction sequence, insures that the other user program has not modified the data in address location 18 when the lower priortiy program has completed processing of this data.

Another use of the Compare and Swap is in a data processing system which includes two or more processors as shown in FIG. 1. Since the processors in this data processing system operate more or less in asynchronous, independent fashion, each may be attempting to initiate access to address location 18 in the shared storage 10. Therefore, implementation of the Compare and Swap instruction in a multiprocessor data processing system requires that the shared storage 10 be made unavailable to processor 12, for example, while processor 13 is accessing operand 2 for comparison purposes. Processor 12 must be prevented access while operand 2 is being compared in compare circuit 25 and while the decision is being made whether or not to insert operand 3 from general purpose register 23 in addressed location 18 of the shared storage 10. In FIG. 1, the shared storage is shown as being a single entity, however many multiprocessor systems are constructed in such a way that each of the processors 12 and 13 has an associated storage 10 and storage control 11. Therefore, processor 12 will have an interconnection 31 to its local storage control 11 as well as an interconnection 17 from processor 13 to storage control 11 of processor 12. The same interconnection would be established for the storage 10 and storage control 11 of processor 13.

Figures 3, 4:
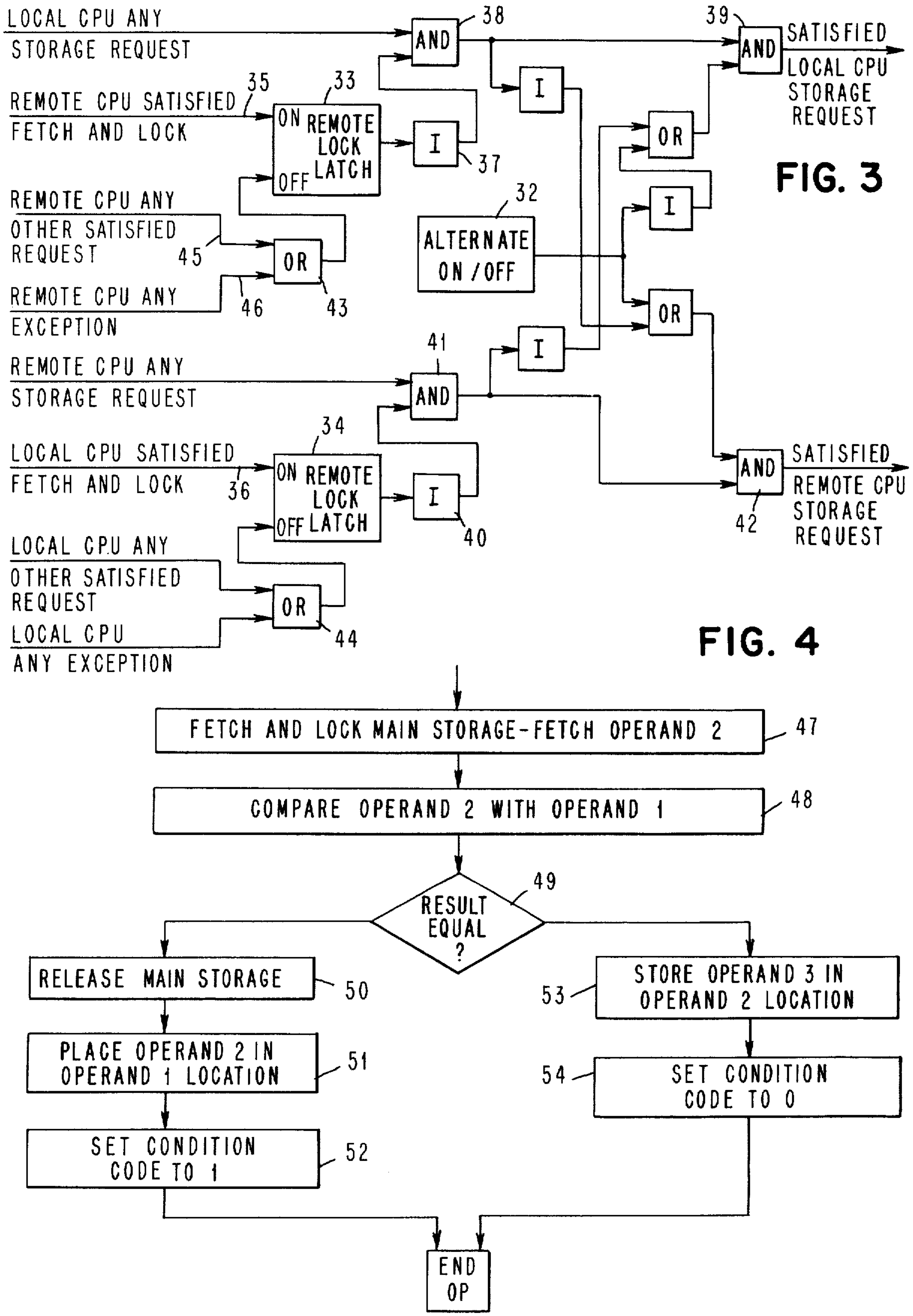
FIG. 3 is a detailed logic diagram of modifications to the storage control shown in FIG. 1.
FIG. 4 is a flow diagram showing the sequence of the controls executed in response to the new instruction Compare and Swap.

FIG. 4 is a logic diagram depicting logic which must be associated with the storage control 11 of each of the processors 12 and 13 to respond to a Compare and Swap instruction to prevent access to an addressed location in a shared store by another processor when the processor executing the Compare and Swap instruction is in the process of utilizing the addressed location.

The shared storage 10 of FIG. 1, would therefore be comprised of two parts, or units. Each of the storage units will have a local processor and a remote processor attached to its associated storage control unit.

Requests to the storage unit from processors 12 and 13 are honored in a serial fashion. That is, in the absence of any special storage access request, each storage control unit will include a trigger 32 which alternates in an on/off fashion to permit alternate use of a particular storage unit by the two processors. In addition to normal tie-breaking and priority controls, each of the storage control units 11 provides the capability of permitting one processor to lock the other processor out of the storage for a brief period of time during execution of the Compare and Swap instruction. These controls are implemented by the use of two latches, a Local Lock Latch 33, and a Remote Lock Latch 34 corresponding to the local and remote processors respectively. The remote lock latch 34 controls access to the storage unit by the remote processor, and the setting of the latch is controlled by the request from the other processor, that is the local processor. Alternatively, access by the local processor is controlled by the setting of the local lock latch 33 under control of the remote processor.

A processor can lock the other processor out of the storage by issuing a special request, "Fetch and Lock" to the storage unit being addressed. When such a request is honored by a particular storage unit, the data is returned to either the local or remote processor and a signal indicating a satisfied fetch and lock is generated. When associated with a remote processor, a line 35 is enabled, and when associated with a local processor, a line 36 is enabled to thereby alternatively set lock latch 33 or 34. If, for example, local lock latch 33 is set in response to the remote processor executing a Compare and Swap instruction, an inverter 37 will disable an AND circuit 38 to prevent AND circuit 39 from being enabled through the normal logic junctioning of the alternate on/off trigger 32. An inverter 40, AND circuit 41, and AND circuit 42 function in the same fashion before permitting a remote processor access to the data store associated with the local processor.

Lock latch 33 or lock latch 34 is turned off by the output of an OR circuit 43 or 44 respectively. In the case of the local lock latch 33, it will be tunred off whenever the remote processor has any other storage request satisfied, indicated on a line 45, or as signalled on a line 46, any exception condition.

FIG. 4 summarizes in a functional flowchart fashion the previously described operation which, in accordance with the present invention, permits the sharing of data in a data store by a plurality of users without requiring that all other users be prevented from utilizing the shared data during processing of the shared data by one of the users. Further, re-execution of the processing of the shared data is automatically initiated when it is found, subsequent to the processing, that a conflict had in fact existed.

During step 47, operand 2 in addressed location 18 of the shared store 10 is fetched, and the storage unit containing the addressed location is locked from any further access in accordance with the logic in FIG. 3. Step 48 causes operand 2 from the addressed location 18 to be compared with operand 1 in general purpose register 22, which operand has the value of the contents of addressed location 18 accessed prior to processing by a program of instructions. The alternate signals 26 or 28 signifying equality or inequality between operand 2 and operand 1 is made at 49. If operand 1 and operand 2 are not equal, the shared storage is released from the lock condition at 50, and at 51, the contents of addressed location 18 representing operand 2 are passed through gate 30 to general purpose register 22 replacing operand 1. At 52, the condition code is set to 1 signifying that the operands were unequal and that the program of instructions which processed the data from addressed location 18 should be reinitiated.

Alternatively, if operand 2 and operand 1 are equal, as determined at 49, this indicates that while the user was processing the contents of addressed location 18 to produce a result stored in general purpose register 23, no other modifications had been made to the contents of addressed location 18. Therefore, at 53, gate 29 will be enabled to store operand 3 from general purpose register location 23 into addressed storage location 18 replacing operand 2. At 54, the condition code is set to 0 to signify that further processing by the user which executed the Compare and Swap instruction can be initiated.

In summary, therefore, it is the function of the present invention to cause a swapping of data to take place in response to the instruction Compare and Swap. That is, in response to execution of the instruction Compare and Swap, operand 1 will be replaced by operand 2 or operand 2 will be replaced by operand 3.

What is claimed is:

1. In a data processing system which includes a plurality of users, each of which may require access to the same data in an addressed location of a data store for the purpose of processing the data accessed in accordance with a first program of instructions, apparatus associated with each of the users comprising:

register means, including a first register means for storing the data accessed from the addressed location and, a second register means for storing data resulting from the processing of the data in said first register by the first program; and replacing means connected to the data store and said register means, including first and second gating means and comparing means, operative subsequent to the processing of the accessed data by the first program of instructions, for comparing by said comparing means the data in the addressed location of the data store and the data from said first register means for producing alternate signals indicating inequality or equality, and for replacing the data in said first register means with the data from the addressed location in the data store by said first gating means upon inequality, or replacing the data in the addressed location of the data store with the processed data from said second register means by said second gating means upon equality.

2. A data processing system in accordance with claim 1 which further includes:

indicator means, responsive to said inequality or equality signalling means, for storing indication thereof; and means, responsive to said indicator means for selectively and alternatively reinitiating the program of instructions for processing the data from the addressed location in said register means, or for initiating further processing by a further program of instructions.

* * * * *